US010739204B1

(12) United States Patent
Duryea

(10) Patent No.: US 10,739,204 B1
(45) Date of Patent: Aug. 11, 2020

(54) BEARING TEMPERATURE SENSING SYSTEM

(71) Applicant: George H. Duryea, Broken Bow, NE (US)

(72) Inventor: George H. Duryea, Broken Bow, NE (US)

( * ) Notice: Subject to any disclaimer, the term of this patent is extended or adjusted under 35 U.S.C. 154(b) by 0 days.

(21) Appl. No.: 16/396,041

(22) Filed: Apr. 26, 2019

Related U.S. Application Data

(60) Provisional application No. 62/663,961, filed on Apr. 27, 2018.

(51) Int. Cl.
| | |
|---|---|
| *G01K 1/02* | (2006.01) |
| *G01M 13/04* | (2019.01) |
| *G01K 1/14* | (2006.01) |
| *G07C 5/08* | (2006.01) |
| *G01M 17/013* | (2006.01) |

(52) U.S. Cl.
CPC ............ *G01K 1/024* (2013.01); *G01K 1/026* (2013.01); *G01K 1/14* (2013.01); *G01M 13/04* (2013.01); *G01M 17/013* (2013.01); *G07C 5/085* (2013.01); *G07C 5/0825* (2013.01); *G07C 5/0833* (2013.01); *G07C 2205/02* (2013.01)

(58) Field of Classification Search
None
See application file for complete search history.

(56) References Cited

U.S. PATENT DOCUMENTS

| | | | |
|---|---|---|---|
| 7,089,099 B2 | 8/2006 | Shostak et al. | |
| 7,228,932 B2* | 6/2007 | Rosenthal | B60K 28/10 180/271 |
| 7,543,499 B2* | 6/2009 | Stubenrauch | G01M 13/045 73/593 |
| 8,327,697 B2* | 12/2012 | McCann | F16C 41/007 73/115.08 |
| 8,631,681 B2* | 1/2014 | Lee | B60G 17/016 73/1.14 |
| 10,197,044 B2* | 2/2019 | Czichowski | F03D 80/70 |
| 10,507,851 B1* | 12/2019 | Byford | G01M 17/10 |
| 2001/0030466 A1* | 10/2001 | Ehrlich | G01P 3/488 303/191 |

(Continued)

FOREIGN PATENT DOCUMENTS

WO   2017189554 A1   11/2017

OTHER PUBLICATIONS

Bearing temperature alarming system for wagon. Patent Translation [online]. Google Patents [retrieved on Jan. 4, 2018]. Retrieved from the Internet: <URL:https://patents.google.com/patent/CN106627658A/en?oq=bearing+heat+sensor+and+smartphone+app>.

(Continued)

*Primary Examiner* — Chico A Foxx
(74) *Attorney, Agent, or Firm* — Cramer Patent & Design, PLLC; Aaron R. Cramer

(57) ABSTRACT

A bearing temperature sensor system is a temperature monitoring system for wheel hub bearings with data from the system capable of being transmitted to a portable electronic device for subsequent analysis. The system has a plurality of temperature monitoring sensors disposed adjacent non-rotating sections of axle assemblies which wirelessly transmit temperature data to a computer controller system located upon the vehicle being monitored.

19 Claims, 4 Drawing Sheets

(56) References Cited

U.S. PATENT DOCUMENTS

| | | | |
|---|---|---|---|
| 2004/0197040 A1* | 10/2004 | Walker | F16C 41/008 |
| | | | 384/462 |
| 2016/0187202 A1* | 6/2016 | Miller | G01J 5/0215 |
| | | | 250/338.1 |
| 2017/0050476 A1* | 2/2017 | Liu | B60C 23/0477 |
| 2017/0113494 A1 | 4/2017 | Singh et al. | |
| 2017/0276570 A9 | 9/2017 | White et al. | |
| 2018/0178601 A1* | 6/2018 | Surendra | G07C 5/008 |
| 2019/0389306 A1* | 12/2019 | Araki | B60K 35/00 |
| 2020/0130437 A1* | 4/2020 | Root | H02K 7/1846 |

OTHER PUBLICATIONS

Wheel hub mounted vehicle data communications device incorporating a self-generating electrical power supply Patent Translation [online]. Google Patents [retrieved on Jan. 4, 2018]. Retrieved from the Internet: <URL:https://patents.google.com/patent/WO2017189554A1/en?oq=truck+hub+bearing+heat+sensor+and+smartphone+app>.

* cited by examiner

BEARING TEMPERATURE SENSING SYSTEM

RELATED APPLICATIONS

The present invention is a continuation of and claims the benefit of U.S. Provisional Application No. 62/663,961, filed Apr. 27, 2018, the entire disclosures of which are incorporated herein by reference.

FIELD OF THE INVENTION

The present invention relates generally to the temperature of motor vehicle bearings and specifically to a bearing temperature sensing system.

BACKGROUND OF THE INVENTION

Modern motor vehicles are a true engineering marvel. Their long-run time between major maintenance is in stark contrast to vehicles of even a few decades ago which required constant adjustment and maintenance just to keep them operational. Additionally, many parameters of vehicle operation are now being tracked by an onboard computer. An example of this is tire pressure which is seen on late model vehicles.

However, there are still many parameters which are left unchecked, and are only apparent to the driver upon total failure. An example of this wheel bearing temperature. Should wheel bearing (hub) temperature be exceeded, bearing damage will result, with additional damage to the spindle which translates into large repair bills; much larger than if corrective action was taken at the point the temperature started to rise. Accordingly, there exists a need for a means by which wheel bearing temperature can be monitored on cars and trucks to allow for pre-emptive repairs and thus an overall lower cost of operation. The development of the wheel bearing monitoring system fulfills this need.

SUMMARY OF THE INVENTION

The principles of the present invention provide for a wheel bearing monitoring system which comprises a plurality of transmitter modules which are installed on a motor vehicle. Each of the transmitter modules generate a wireless radio frequency signal which is received by a portable computing device. The wireless radio frequency signal utilizes a wireless protocol. The transmitter modules are installed on a plurality of bearing assemblies with each of the bearing assemblies at each of a plurality of wheels is provided with a temperature indicia representative of an internal temperature at each of the bearing assemblies.

The system also comprises a spindle which has a spindle connector which is located at a first distal end. The transmitter modules are installed on the spindle. The system also comprise a set of seals, a plurality of races, and a retaining system utilized with a hub. The hub has a flange with a plurality of apertures receiving a plurality of fasteners to attach the hub to the motor vehicle. The system also comprises a transmitter enclosure which is electrically connected to a temperature sensor via an interconnecting cabling. The interconnecting cabling is positioned on the spindle such that it is in between an inner bearing and an outer bearing.

The system also comprises a vehicle icon which resides on the portable computing device and an internal non-transitory storage media which provides each of the temperature indicia that is refreshed on a periodic basis. The internal temperature of all of the bearing assemblies are monitored as provided on by the internal non-transitory storage media. The internal non-transitory storage media resides on the portable computing device.

The transmitter modules may be installed at the bearing assemblies. The motor vehicle may be selected from the group consisting of a tractor-trailer rig, an automobile, a truck, a bus, a sport utility vehicle, or a recreational vehicle while the portable computing device may be a smart phone. The portable computing device may be a tablet computer. The wireless protocol may be selected from the group consisting of a Bluetooth wireless protocol, a wireless fidelity wireless protocol, an IEEE 802.11 standards wireless protocol, or a dedicated low power radio signal wireless protocol. The portable computing device may be located within an operator's position of the motor vehicle. The portable computing device may be monitored while the motor vehicle is underway. The transmitter enclosure may be held in place with a magnet. The magnet is a rare-earth type magnet for strength. The transmitter enclosure may be without an electrical interface to a plurality of motor vehicle wiring. The transmitter enclosure may rely upon an internal replaceable battery. The periodic basis is in the range of every five to ten seconds. The vehicle icon is a photometric image which is representative of a type and a style of the motor vehicle. The temperature indicia may exceed a present limit as defined during initial setup of the internal non-transitory storage media. The temperature indicia may transform into a temperature indicia alarm status.

The temperature indicia alarm status may be of a different color, a different size, or a flashing status and may comprise an audible alert which is issued from the portable computing device. The temperature indicia alarm status may allow action to prevent further temperature increases and thus further damage to the spindle, the inner bearing, the outer bearing, the seals, the races or the hub and may be within the range of twenty to thirty seconds. The wheel bearing monitoring system may be utilized with a mechanical machine utilizing the bearings.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
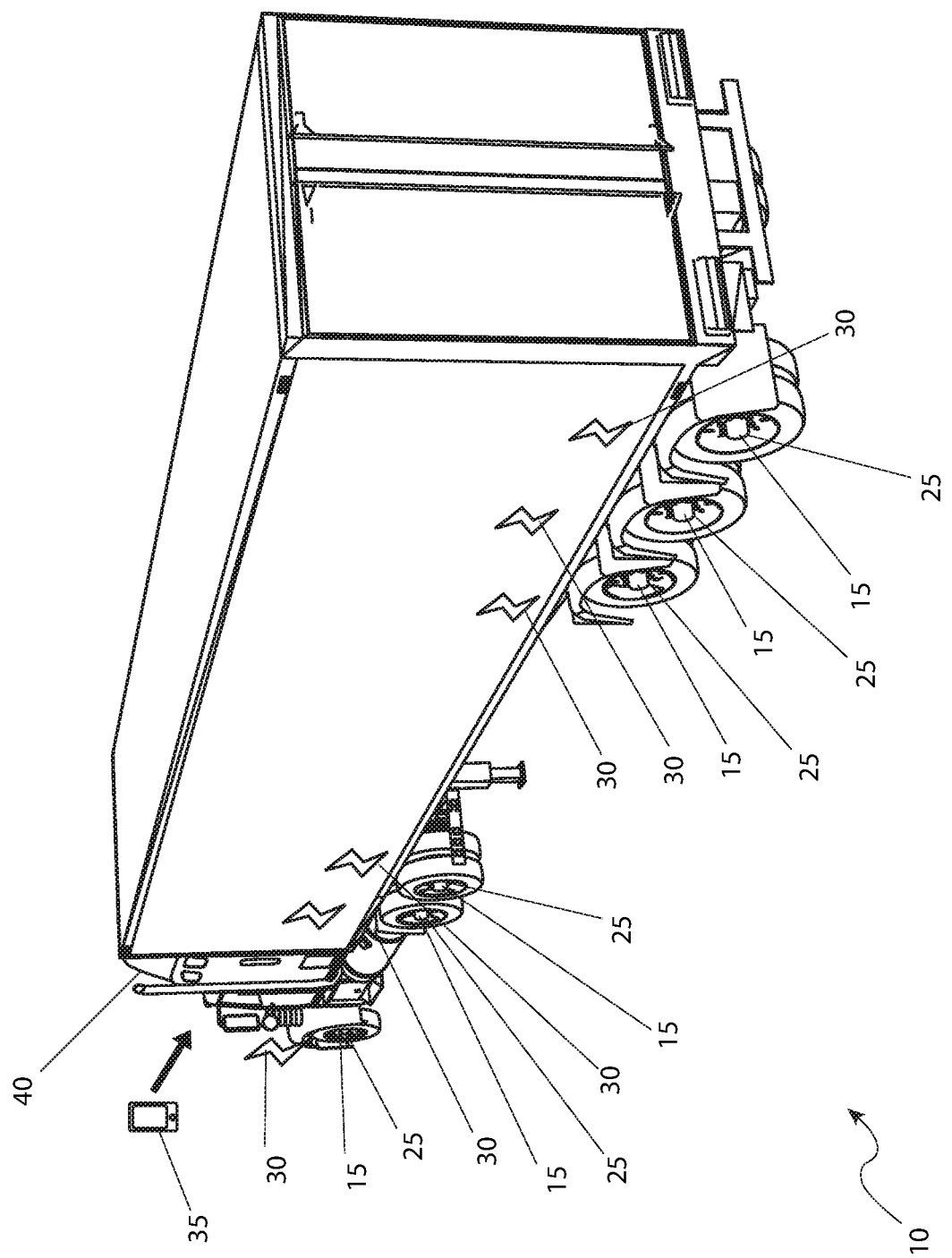
FIG. 1 is an illustrative view of the wheel bearing monitoring system 10, according to the preferred embodiment of the present invention.

DESCRIPTIVE KEY 10 wheel bearing monitoring system
15 transmitter module 20 motor vehicle
25 bearing assembly
30 wireless radio frequency signal
35 portable computing device
40 operator's position
45 spindle
50 inner bearing
55 outer bearing
60 seal
65 race
70 retaining system
75 hub
76 flange
77 aperture
80 transmitter enclosure
85 temperature sensor
87 spindle connector
90 interconnecting cabling
95 magnet
100 vehicle icon
105 wheel
110 temperature indicia
115 internal software programming
120 user
125 temperature indicia alarm status
130 signal conditioning circuit
135 transmitter circuit
140 internal antenna
145 user replaceable battery
150 connection contact 1. Description of the Invention The best mode for carrying out the invention is presented in terms of its preferred embodiment, herein depicted within FIGS. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. Detailed Description of the Figures

Referring now to FIG. 1, an illustrative view of the wheel bearing monitoring system 10, according to the preferred embodiment of the present invention is disclosed. The wheel bearing monitoring system 10 (herein also described as the "system") 10, includes multiple transmitter modules 15 installed on a motor vehicle 20 on or at bearing assemblies 25. The motor vehicle 20 in FIG. 1 is depicted as a tractor-trailer rig for purposes of illustration only. Other motor vehicle 20 such as automobiles, trucks, busses, sport utility vehicles, recreational vehicles, and the like could benefit from the teachings of the wireless wheel bearing monitoring system 10. As such, the use of the system 10 with any specific type of motor vehicle 20 or trailer, is not intended to be a limiting factor of the present invention.

Each transmitter module 15 generates a wireless radio frequency signal 30 which is received by a portable computing device 35, such as a smart phone or tablet computer or the like. The wireless radio frequency signal 30 is envisioned to utilize any one (1) of a wide variety of wireless protocols including but not limited to Bluetooth®, wireless fidelity (Wi-Fi using IEEE 802.11 standards), or other dedicated low power radio signal. The use of any particular type or method of wireless protocol is not intended to be a limiting factor of the present invention.

The portable computing device 35 is located within an operator's position 40 of the motor vehicle 20, such that it may be monitored while the motor vehicle 20 is underway. Its portable nature also allows usage around the perimeter boundary of the motor vehicle 20 during inspection walks or troubleshooting occurrences. While the current figure, accompanying description, and additional disclosure herein below depict usage of the system 10 with a motor vehicle, the system 10 can be utilized with any mechanical machine utilizing bearings. As such, the usage of the system 10 with a motor vehicle 20 is not intended to be a limiting factor of the present invention.

Figure 2:
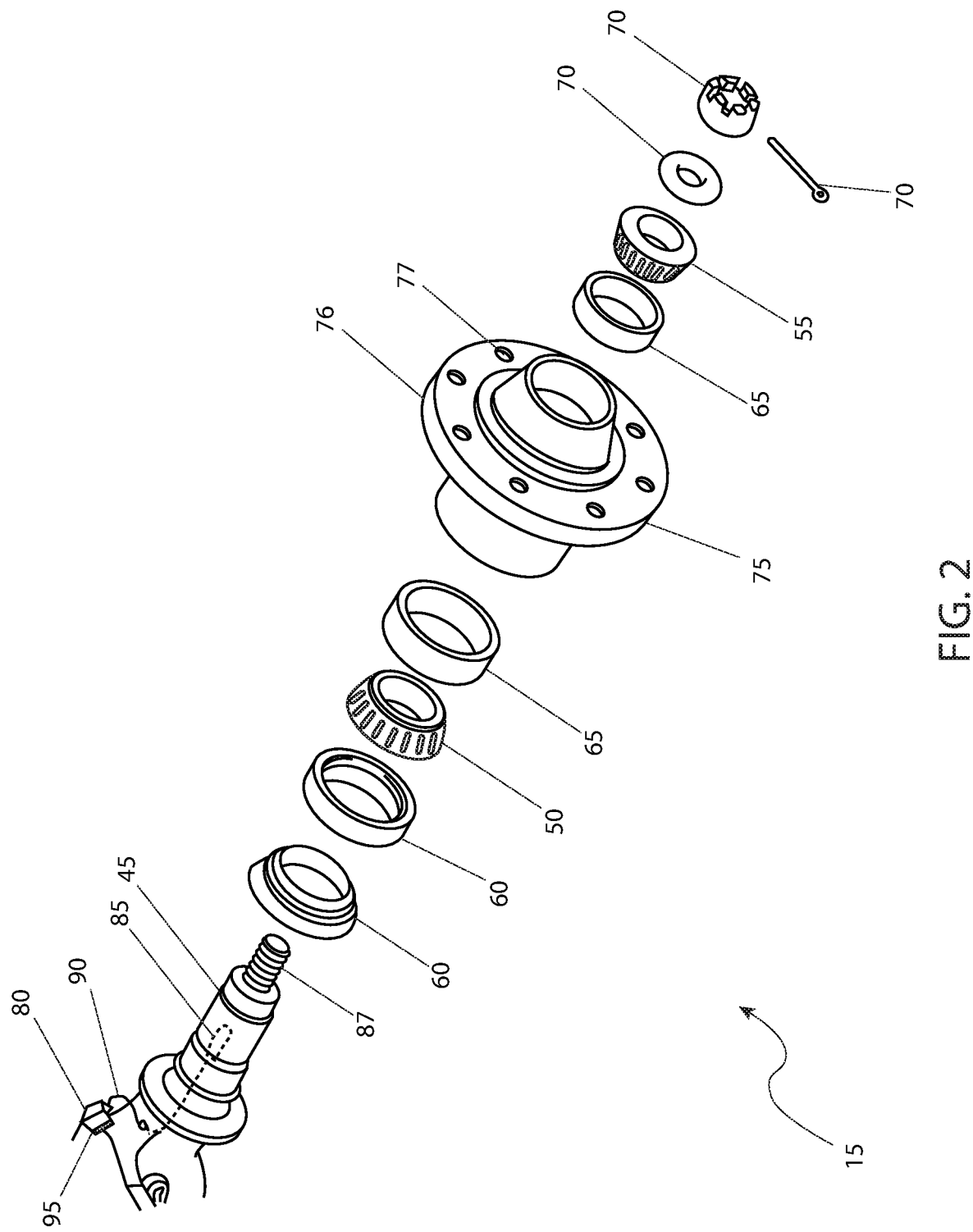
FIG. 2 is a pictorial view of the transmitter modules 15, as used with the wheel bearing monitoring system 10 shown in an installed state on a spindle 45, according to the preferred embodiment of the present invention.

Referring next to FIG. 2, a pictorial view of the transmitter modules 15, as used with the system 10 shown in an installed state on a spindle 45, according to the preferred embodiment of the present invention is depicted. The spindle 45 as illustrated is typical of a conventional wheel assembly, having a spindle connector 47 located at a first distal end thereof. It is noted that all components are not necessarily indicated and that orientation, size, configuration, and the like is intended to be generic in nature. A set of seals 60, races 65, and a retaining system 70 are used with a hub 75 in a conventional manner. The hub 75 has a flange 76 with a plurality of apertures 77, capable of receiving fasteners to attach the hub 75 to the motor vehicle 20. A transmitter enclosure 80 is electrically connected to a temperature sensor 85 via an interconnecting cabling 90. The interconnecting cabling 90 is positioned on the spindle 45 such that it is in between the inner bearing 50 and the outer bearing 55 when in an assembled state. As such, the temperature sensor 85 would be installed during the manufacturing process of the spindle 45. Other versions which sense temperatures of the spindle 45 on either the external side or internal side of the spindle 45 are also envisioned, and as such, should not be interpreted as a limiting factor of the present invention. The transmitter enclosure 80 is held in place with a magnet 95 envisioned to be of the rare-earth type magnet for strength. Placement of the transmitter enclosure 80 upon the spindle 45 may vary depending on the make and model of the specific spindle 45. It is noted that the transmitter enclosure 80 has no electrical interface to the wiring of the motor vehicle 20 (as shown in FIG. 1) and relies on an internal replaceable battery as will be shown in greater detail herein below.

Figure 3:
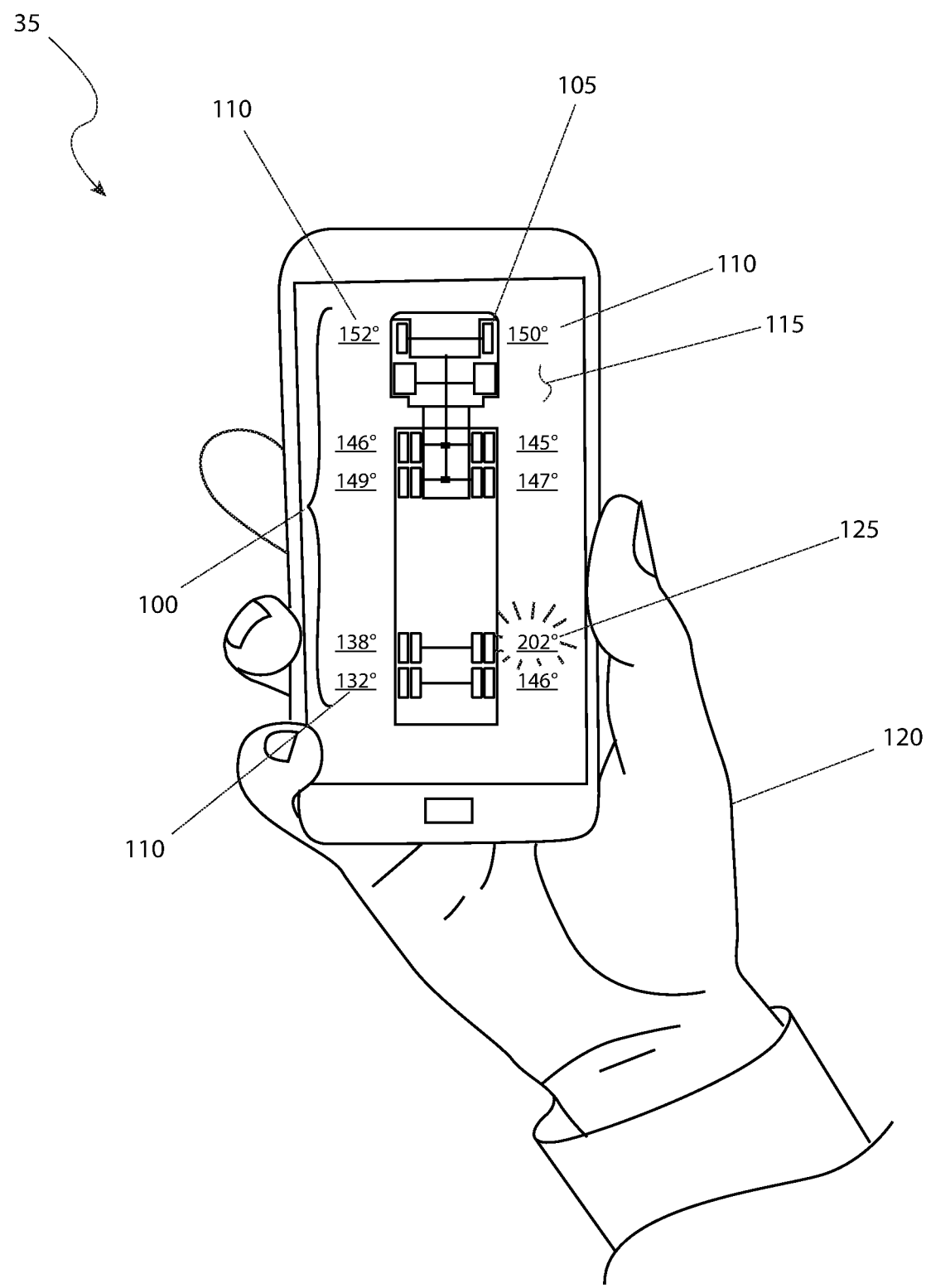
FIG. 3 is a front view of a vehicle icon 100 on a portable computing device 35, as used with the wheel bearing monitoring system 10, according to the preferred embodiment of the present invention; and, FIG. 4 is an electrical schematic block diagram depicting the major electrical components of the transmitter module 15, as used with the wheel bearing monitoring system 10, according to the preferred embodiment of the present invention.

Referring now to FIG. 3, a front view of a vehicle icon 100 residing on a portable computing device 35, as used with the system 10, according to the preferred embodiment of the present invention is shown. The vehicle icon 100 is a photometric image representative of the type and style of motor vehicle 20 (as shown in FIG. 1). As such each bearing assemblies 25 at each wheel 105 is provided with a temperature indicia 110 representative of the internal temperature at each bearing assemblies 25. An internal non-transitory storage media (software programming) 115 provides each temperature indicia 110 that is refreshed on a periodic basis envisioned to be approximately in the range of every five to ten seconds (5-10 s). The user 120 may thus monitor the internal temperature of all bearing assemblies 25 as provided on his or her vehicle. Should any temperature indicia 110 exceed a present limit as defined during initial setup of the internal software programming 115, the temperature indicia 110 will transform into a temperature indicia alarm status 125 envisioned to be different color, different size, and/or flashing status, along with an audible alert issued from the portable computing device 35. As such, the temperature indicia alarm status 125 allows the user 120 to take immediate action, within twenty to thirty seconds (20-30 s) to prevent further temperature increases and thus further damage to the spindle 45 (as shown in FIG. 2), the inner bearing 50 (as shown in FIG. 2), the outer bearing 55 (as shown in FIG. 2), the seals 60 (as shown in FIG. 2), the races 65 (as shown in FIG. 2) or the hub 75 (as shown in FIG. 2).

Figure 4:
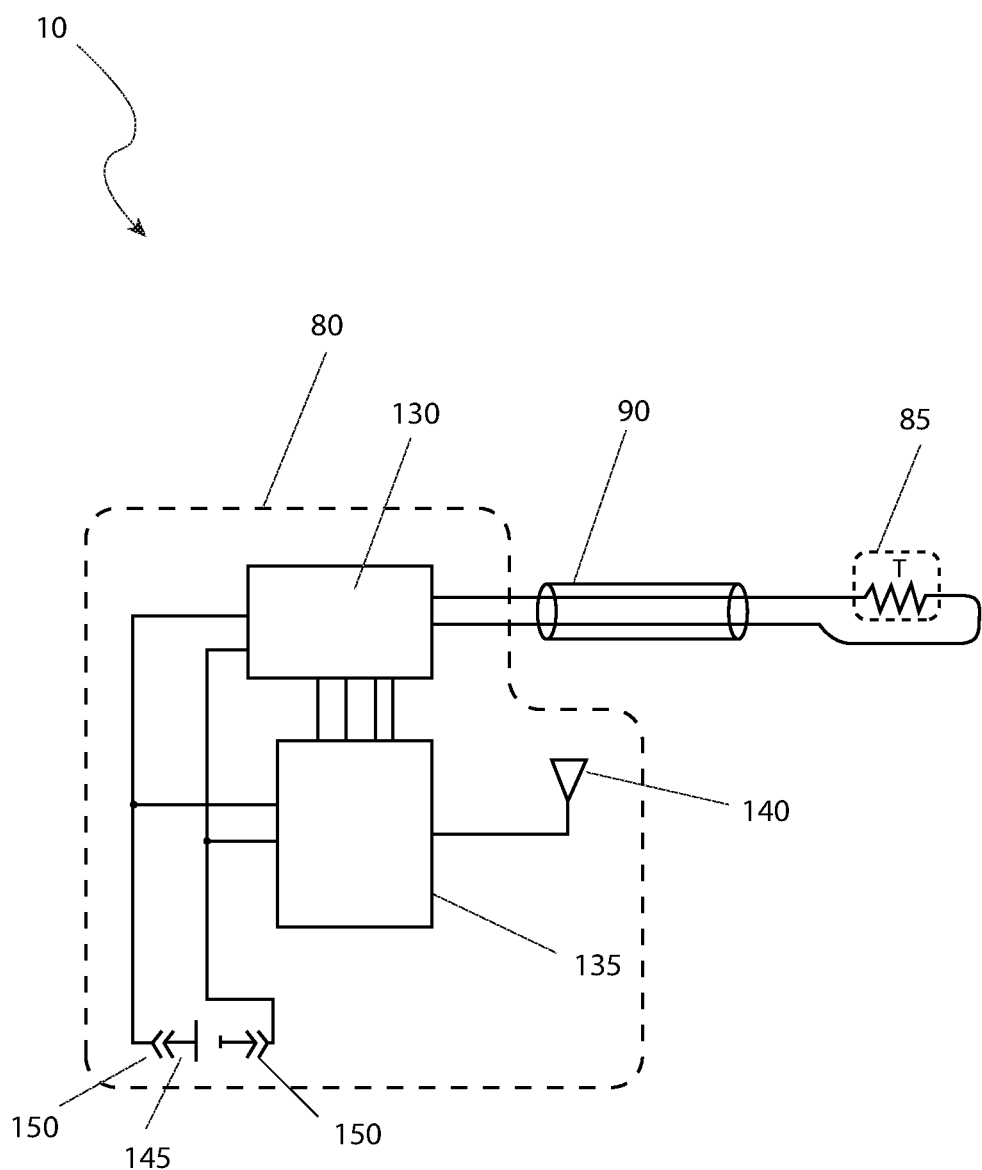

Referring to FIG. 4, an electrical schematic block diagram depicting the major electrical components of the transmitter modules 15, as used with the system 10, according to the preferred embodiment of the present invention is disclosed. The temperature sensor 85 is connected to the transmitter enclosure 80 via the interconnecting cabling 90 as aforementioned described. Internal to the transmitter enclosure 80, the interconnecting cabling 90 connects to a signal conditioning circuit 130 which is envisioned to convert the analog signal of the temperature sensor 85 into a respective digital signal that is broadcast by a transmitter circuit 135 to an internal antenna 140. The internal antenna 140 thus produces the wireless radio frequency signal 30 (as shown in FIG. 1). Both the signal conditioning circuit 130 and the transmitter circuit 135 are powered by a user replaceable battery 145 isolated by connection contacts 150. The connection contacts 150 allows for periodic replacement (envisioned to be approximately yearly due to the low power characteristics of the system 10). The block diagram is repeated for every respective transmitter modules 15 as used with each system 10.

2. Operation of the Preferred Embodiment

The preferred embodiment of the present invention can be utilized by the common user in a simple and effortless manner with little or no training. It is envisioned that the system 10 would be constructed in general accordance with FIG. 1 through FIG. 4. The user would procure the system 10 while paying particular regard to the number of transmitter modules 15 needed for each bearing assemblies 25. Additionally, the decision of an integrated temperature sensor 85 versus one (1) on the external side of the spindle 45 would be necessary. Accordingly, the internal based version would likely be part of an OEM system as provided by a manufacturer of the respective motor vehicle 20.

After procurement and prior to utilization, the system 10 would be prepared in the following manner: an appropriate internal software programming 115, or "app", would be downloaded and installed on the portable computing device 35 of the user 120; initial setup and pairing of each transmitter modules 15 used would be initiated; and pre-commissioning testing and verification would be accomplished.

During utilization of the system 10, the following procedure would be initiated: the user 120 would drive or operate the motor vehicle 20 in a normal manner; monitoring either by periodic visual inspection of the vehicle icon 100 on the portable computing device 35 and/or reliance of the internal programming of the system 10 would be utilized; should any temperature excursions beyond pre-defined temperature limits be noted, the user 120 would take immediate action to stop operation of the motor vehicle 20 and initiate repair or other corrective action.

After use of the system 10, it is deactivated on the portable computing device 35 in the same manner as other software; no deactivation of the individual transmitter modules 15 is required. During follow on usage, the internal software programming 115 is simply reactivated whereupon automatic connection with each transmitter modules 15 is accomplished via the wireless radio frequency signal 30; actual usage then continues in a normal manner as defined above in a sequential and circular manner.

Effective usage of the system 10 will reduce overall repair costs and reduce down time and allow the user 120 to obtain repairs before major vehicle damage can occur. While envisioned for use with motor vehicles, the teachings of the present invention can be applied to any machine which utilizes bearings.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A wheel bearing monitoring system, comprising:
 a plurality of transmitter modules installed on a motor vehicle, each of the transmitter modules generate a wireless radio frequency signal which is received by a portable computing device, the wireless radio frequency signal utilizes a wireless protocol, the transmitter modules are respectively installed on a plurality of bearing assemblies, each of the bearing assemblies respectively located at a respective wheel of a plurality of wheels of the motor vehicle to provide a respective temperature indicia of an internal temperature of each of the bearing assemblies on a display of the portable computing device, each of the bearing assemblies comprising:
  a spindle having a spindle connector located at a first distal end thereof, the transmitter modules are installed on the spindle;
  a set of seals, a plurality of races, and a retaining system utilized with a hub, the hub having a flange with a plurality of apertures receiving a plurality of fasteners to attach the hub to the motor vehicle;
 a transmitter enclosure electrically connected to a temperature sensor via an interconnecting cabling to provision indication of the respective temperature indicia, the interconnecting cabling is positioned on the spindle such that it is in between an inner bearing and an outer bearing;
 a vehicle icon residing on the portable computing device's display providing a visual indication of each position of the plurality of bearing assemblies respectively; and
 an internal non-transitory storage media providing each of the temperature indicia that is refreshed on a periodic basis by utilizing the wireless protocol, the internal temperature of all of the bearing assemblies are monitored as provided on by the internal non-transitory storage media to enable provision of the visual indication of the plurality of bearing assemblies, the internal non-transitory storage media residing on the portable computing device.

2. The wheel bearing monitoring system, according to claim 1, wherein the motor vehicle is selected from the group consisting of a tractor-trailer rig, an automobile, a truck, a bus, a sport utility vehicle, or a recreational vehicle.

3. The wheel bearing monitoring system, according to claim 1, wherein the portable computing device is a smart phone.

4. The wheel bearing monitoring system, according to claim 1, wherein the portable computing device is a tablet computer.

5. The wheel bearing monitoring system, according to claim 1, wherein the wireless protocol is selected from the group consisting of a Bluetooth wireless protocol, a wireless fidelity wireless protocol, an IEEE 802.11 standards wireless protocol, or a dedicated low power radio signal wireless protocol.

6. The wheel bearing monitoring system, according to claim 1, wherein the portable computing device is located within an operator's position of the motor vehicle.

7. The wheel bearing monitoring system, according to claim 6, wherein the portable computing device is monitored while the motor vehicle is underway.

8. The wheel bearing monitoring system, according to claim 1, wherein the transmitter enclosure is held in place with a magnet.

9. The wheel bearing monitoring system, according to claim 8, wherein the magnet is a rare-earth type magnet for strength.

10. The wheel bearing monitoring system, according to claim 1, wherein the transmitter enclosure is without an electrical interface to a plurality of motor vehicle wiring.

11. The wheel bearing monitoring system, according to claim 1, wherein the transmitter enclosure relies on an internal replaceable battery.

12. The wheel bearing monitoring system, according to claim 1, wherein the periodic basis is in the range of every five to ten seconds.

13. The wheel bearing monitoring system, according to claim 1, wherein the vehicle icon is a photometric image representative of a type and a style of the motor vehicle.

14. The wheel bearing monitoring system, according to claim 1, wherein the temperature indicia exceeds a present limit as defined during initial setup of the internal non-transitory storage media, the temperature indicia transforms into a temperature indicia alarm status.

15. The wheel bearing monitoring system, according to claim 14, wherein the temperature indicia alarm status is a different color, a different size, or a flashing status.

16. The wheel bearing monitoring system, according to claim 14, wherein the temperature indicia alarm status further comprises an audible alert issued from the portable computing device.

17. The wheel bearing monitoring system, according to claim 14, wherein the temperature indicia alarm status allows action to prevent further temperature increases and thus further damage to the spindle, the inner bearing, the outer bearing, the seals, the races or the hub.

18. The wheel bearing monitoring system, according to claim 17, wherein the temperature indicia alarm status allows immediate action within the range of twenty to thirty seconds.

19. The wheel bearing monitoring system, according to claim 1, wherein the wheel bearing monitoring system is utilized with a mechanical machine utilizing the bearings.

* * * * *